(12) United States Patent  
Gintis et al.

(10) Patent No.: US 8,832,309 B2  
(45) Date of Patent: Sep. 9, 2014

(54) GENERATING PACKETS WITH LOW OVERHEAD OR SELECTABLE SEQUENCE NUMBER GENERATION

(75) Inventors: Noah Gintis, Westlake Village, CA (US); Matthew R. Bergeron, Thousand Oaks, CA (US)

(73) Assignee: Ixia, Calabasas, CA (US)

( * ) Notice: Subject to any disclaimer, the term of this patent is extended or adjusted under 35 U.S.C. 154(b) by 259 days.

(21) Appl. No.: 13/517,538

(22) Filed: Jun. 13, 2012

(65) Prior Publication Data

US 2013/0339538 A1  Dec. 19, 2013

(51) Int. Cl.  
*G06F 15/16*  (2006.01)

(52) U.S. Cl.  
USPC .......................................... 709/236; 711/118

(58) Field of Classification Search  
CPC ..... G06F 15/16; H04L 29/06; H04L 29/0653; H04L 49/90  
USPC ......................................................... 709/236  
See application file for complete search history.

(56) References Cited

U.S. PATENT DOCUMENTS

| | | | |
|---|---|---|---|
| 6,870,492 B1 * | 3/2005 | Jensen | 341/61 |
| 2002/0116677 A1 * | 8/2002 | Morelos-Zaragoza | 714/781 |
| 2005/0225460 A1 * | 10/2005 | Jensen | 341/61 |
| 2008/0109505 A1 * | 5/2008 | Prantl | 708/313 |
| 2010/0095064 A1 * | 4/2010 | Aviles | 711/118 |

OTHER PUBLICATIONS

Declaration by Inventors dated Apr. 22, 2014 for U.S. Appl. No. 13/517,538.

* cited by examiner

*Primary Examiner* — Tauqir Hussain  
(74) *Attorney, Agent, or Firm* — Jenkins, Wilson, Taylor & Hunt, P.A.

(57) ABSTRACT

Methods, systems, and computer readable media for generation of sequence numbers for insertion into a data stream are disclosed. According to one aspect, low-overhead sequence number generation includes reading a stored set of coefficients and using them to calculate a value for a sequence number according to an equation for calculating a sequence number value, but not changing the values of the stored set of coefficients during generation of the sequence numbers. According to another aspect, a sequence number generation method is selected from multiple available methods based on a desired pattern of sequence numbers and used to generate sequence numbers that are included in a data stream. According to yet another aspect, sequence numbers are calculated using multiple inputs, each input being a counter output or a value referenced by a counter output.

19 Claims, 12 Drawing Sheets

SIMPLE SEQUENCE

| PGID | SEQ |
|---|---|
| 1 | 1 |
| 1 | 2 |
| 1 | 3 |
| 1 | : |
| 1 | N-1 |
| 1 | N |
| 1 | 1 |
| 1 | 2 |
| 1 | : |

FIG. 7A

2-LEVEL NESTED

| PGID | SEQ |
|---|---|
| 1 | 1 |
| 2 | 1 |
| 3 | 1 |
| 1 | 2 |
| 2 | 2 |
| 3 | 2 |
| 1 | 3 |
| 2 | 3 |
| 3 | 3 |
| : | : |
| 1 | N-1 |
| 2 | N-1 |
| 3 | N-1 |
| 1 | N |
| 2 | N |
| 3 | N |
| 1 | 1 |
| 2 | 1 |
| 3 | 1 |
| : | : |

FIG. 7B

3-LEVEL NESTED

| PGID | SEQ |
|---|---|
| 1 | 1 |
| 1 | 2 |
| 2 | 1 |
| 2 | 2 |
| 3 | 1 |
| 3 | 2 |
| 1 | 3 |
| 1 | 4 |
| 2 | 3 |
| 2 | 4 |
| 3 | 3 |
| 3 | 4 |
| : | : |
| 1 | N-1 |
| 1 | N |
| 2 | N-1 |
| 2 | N |
| 3 | N-1 |
| 3 | N |
| 1 | 1 |
| 1 | 2 |
| 2 | 1 |
| 2 | 2 |
| 3 | 1 |
| 3 | 2 |
| : | : |

FIG. 7C

LINEAR COEFFICIENTS

| PGID | SEQ(Y) |
|---|---|
| 1 | 1 |
| 1 | 2 |
| 2 | 1 |
| 1 | 3 |
| 1 | 4 |
| 2 | 2 |
| 1 | 5 |
| 1 | 6 |
| 2 | 3 |
| ⋮ | ⋮ |
| 1 | 2N+1 |
| 1 | 2N+2 |
| 2 | N+1 |
| 1 | 1 |
| 1 | 2 |
| 2 | 1 |

FIG. 7D

READ-MODIFY-WRITE

| PGID | SEQ(Y) |
|---|---|
| 1 | 1 |
| 2 | 1 |
| 4 | 1 |
| 1 | 2 |
| 3 | 1 |
| 3 | 2 |
| 1 | 3 |
| 2 | 2 |
| 4 | 2 |
| 3 | 3 |
| 2 | 3 |
| 1 | 4 |
| 3 | 4 |
| 4 | 3 |
| 3 | 5 |
| 2 | 4 |

FIG. 7E

GENERATING PACKETS WITH LOW OVERHEAD OR SELECTABLE SEQUENCE NUMBER GENERATION

TECHNICAL FIELD

The subject matter described herein relates to efficiently generating packet network traffic in high volumes and/or with a minimum of hardware resources. More particularly, the subject matter described herein relates to methods, systems, and computer readable media for data generation with low-overhead, selectable, or flexible sequence number generation.

BACKGROUND

Packet-based networking protocols, such as Internet protocol (IP), commonly include sequence numbers within the packets. Sequence numbers are used to by the receiving side to reassemble received packets into the correct order and which make it possible for the receiving side to detect and request retransmission of dropped packets. A flow of related packets is herein referred to as a session. Example sessions include data transmissions, such as a file transfer, downloading of multimedia, such as a streaming video, two-way communication using voice over IP (VoIP), and so on. Each session may have its own distinct sequence of numbers. A group of flows or sessions is herein referred to as a stream.

Some types of network testing equipment test a network or test particular nodes on the network by generating network traffic, i.e., packets, sending the generated traffic to the device under test (DUT), receiving packets from the DUT, and analyzing the results to determine, for example, the DUT's latency, throughput, ability to handle malformed packets, and so on. It is desirable for network test equipment to be able to emulate traffic from many different sources and many different sessions simultaneously. This requires the ability to generate and maintain separate sequence numbers for each of the various sources and sessions being emulated. A conventional approach to maintaining separate sequence numbers is to store current values of a particular sequence number in memory, e.g., using a variable in software. This approach is illustrated in FIG. 1.

FIG. 1 is a flow chart showing a conventional method of generating sequence numbers by using variables that are stored in memory. At step 100, memory is allocated for a variable used to store the next sequence value. In the embodiment illustrated in FIG. 1, the variable is named "SEQ". For example, a location in DRAM memory might be reserved to store this variable. At step 102, the variable named SEQ is initialized, e.g., SEQ is set to a starting value. This involves writing this value to the memory location that has been allocated for storing SEQ. The process then moves to step 104, which waits until the value of SEQ is needed. For example, during traffic generation, when the test equipment generates the next packet in the session, the process goes to step 106, in which the memory location is read to get the current value of SEQ, and then to step 108, where the current value of SEQ is inserted into or included in the header of the packet being generated. The completed packet is eventually sent out, i.e., transmitted to its intended destination over the network.

At step 110, the value of SEQ is incremented and stored, which means that the updated value of SEQ is written to the memory location allocated for storing SEQ, and the flow chart returns to step 104, where it waits for the next time that SEQ is needed. The read-modify-write operation described in steps 106, 108, and 110 must be performed every time the variable SEQ is used and incremented. Although this may not seem like a significant amount of overhead, the cumulative performance cost of this overhead increases with the number of packets generated by the test equipment per unit time. For test equipment that generates a large rate of traffic, particularly where the test equipment emulates large numbers of sources and/or sessions, this overhead becomes burdensome and may even cause a system bottleneck that constrains the overall performance of the test equipment itself.

Another conventional method is to use a counter output as the source for sequence numbers, where each packet contains a sequence number that is equal to the next counter value. This method has the disadvantage that only simple sequences may be generated. Such systems are not flexible enough to generate complex or arbitrary sequences. A further disadvantage to the conventional systems described above is that each uses only one method, e.g., simple counter systems do not perform read-modify-write operations and vice-versa.

Accordingly, in light of these disadvantages associated with conventional approaches to generating sequence numbers, there exists a need for data generation with low-overhead, selectable, and flexible sequence number generation.

SUMMARY

According to one aspect, the subject matter described herein includes a system for data generation with low-overhead sequence number generation. The system includes a data storage entity for storing a set of coefficients for generating a sequence of numbers according to a desired pattern, a sequence number generator for generating the sequence of numbers according to the desired pattern for insertion into a data stream, and a data generator for generating and sending a data stream that includes the generated sequence numbers over a network. The sequence number generator reads from the data storage entity the set of coefficients and uses the set of coefficients to calculate a value for a sequence number according to an equation for calculating a sequence number value. During generation of the sequence numbers, the values of the set of coefficients that are stored in the data storage entity do not change. In one embodiment, the generated sequence numbers are inserted into packets that are sent over a packet network.

According to another aspect, the subject matter described herein includes a system for data generation with selectable sequence number generation method. The system includes a sequencing method selection module for selecting, from multiple sequence number generation methods, a sequence number generation method for generating a desired pattern of sequence numbers to be included in a generated data stream and using the selected sequence number generation method to generate the desired pattern of sequence numbers. The system also includes a data generator module for generating a data stream that contains the generated sequence numbers sending the generated packets over a network. In one embodiment, the generated sequence numbers are inserted into packets that are sent over a packet network.

According to yet another aspect, the subject matter described herein includes a system for sequence number generation for insertion into a data stream, multiple counters, a sequence number generator for generating a sequence of numbers according to a desired pattern, and a data generator for generating and sending over a network a data stream that includes the generated sequence of numbers. The sequence number generator receives input values and uses them to calculate a number in the sequence. Each of the input values is an output of one of the counters or a value referenced by an output of one of the counters.

According to yet another aspect, the subject matter described herein includes a method for data generation with low overhead sequence number generation. The method includes storing, in a data storage entity, a set of coefficients for generating a sequence of numbers according to a desired pattern, generating the sequence of numbers according to the desired pattern, generating a data stream that includes the generated sequence, and sending the generated data stream over a network. Generating the sequence numbers includes reading from the data storage entity the set of coefficients and using the set of coefficients to calculate a value for a sequence number according to an equation for calculating a sequence number value. During generation of the sequence numbers, the values of the set of coefficients that are stored in the data storage entity do not change. In one embodiment, the generated data stream may include packets, which are sent over a packet network.

According to yet another aspect, the subject matter described herein includes a method for data generation with selectable sequence number generation. The method includes, at an entity for generating a data stream: determining a desired pattern of sequence numbers to be included in a generated data stream; selecting, from a plurality of sequence number generation methods and based on the desired pattern of sequence numbers, a sequence number generation method; using the selected sequence number generation method to generate sequence numbers in the desired pattern; generating a data stream that contains the generated sequence numbers; and sending the generated data stream over a network. In one embodiment, the generated data stream may include packets, which are sent over a packet network.

According to yet another aspect, the subject matter described herein includes a method for generation of sequence numbers for insertion into a data stream. A sequence number generator for generating a sequence of numbers according to a desired pattern receives multiple input values and using the received input values to calculate numbers in the sequence. A data stream that includes the generated sequence of numbers is generated and sent over a network. Each of the input values is an output of one of the counters or a value referenced by an output of one of the counters.

The subject matter described herein can be implemented in hardware or in hardware in combination with software and/or firmware. For example, the subject matter described herein can be implemented in software executed by a processor. In one exemplary implementation, the subject matter described herein can be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

Preferred embodiments of the subject matter described herein will now be explained with reference to the accompanying drawings, wherein like reference numerals represent like parts, of which:

FIG. 7A shows an example of a simple sequence according to an embodiment of the subject matter described herein;

FIG. 7B shows an example of a 2-level nested sequence according to an embodiment of the subject matter described herein;

FIG. 7C shows an example of a 3-level nested sequence according to an embodiment of the subject matter described herein;

FIG. 7D shows an example of generating sequence numbers using linear coefficients according to an embodiment of the subject matter described herein;

FIG. 7E shows an example of generating sequence numbers using a read-modify-write algorithm according to an embodiment of the subject matter described herein;

DETAILED DESCRIPTION

In accordance with the subject matter disclosed herein, systems, methods, and computer readable media for sequence number generation are provided.

Reference will now be made in detail to exemplary embodiments of the present invention, examples of which are illustrated in the accompanying drawings. Wherever possible, the same reference numbers will be used throughout the drawings to refer to the same or like parts.

Figure 2:
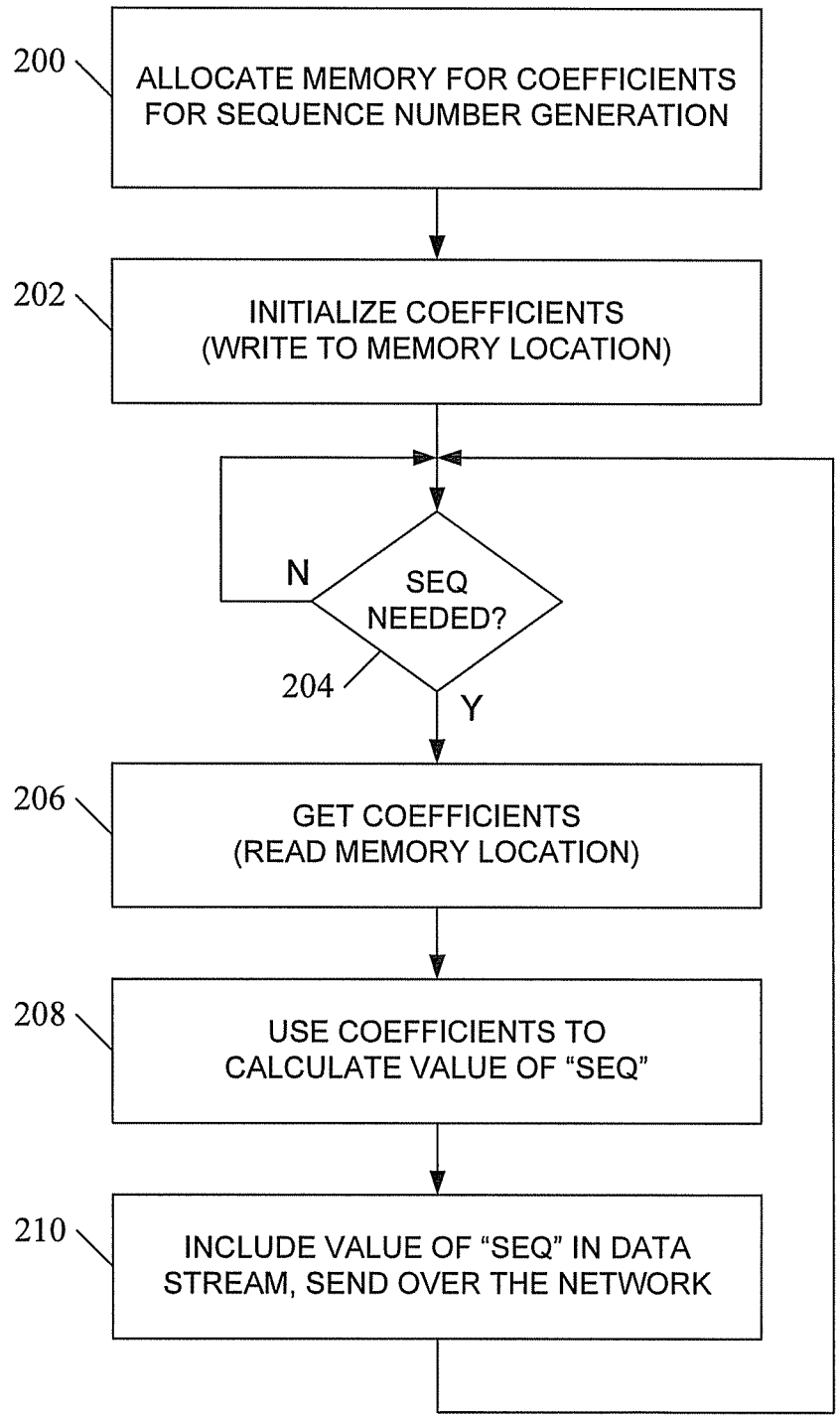
FIG. 2 is a flow chart illustrating an exemplary process for generating a data stream with low-overhead sequence number generation according to an embodiment of the subject matter described herein.

FIG. 2 is a flow chart illustrating an exemplary process for generating a data stream with low-overhead sequence number generation according to an embodiment of the subject matter described herein. Rather than using memory to store sequence numbers as done by conventional approaches, sequence numbers are generated according to an equation which uses coefficients to generate the sequence numbers. In one embodiment, each emulated source and/or emulated session may get its own unique set of coefficients. In one embodiment, these coefficients are defined once and remain constant for as long as packets are being generated for that source and/or session.

Thus, in one embodiment, at step 200 memory is allocated for use to store coefficients that will be used in the equation that generates sequence numbers for a particular sequence. At step 202 the coefficients are initialized, e.g., the coefficients are written to the memory location allocated for that purpose. The process then waits at step 204 until the next number in the sequence, "SEQ", is needed. When SEQ is needed, the process moves to step 206, where the coefficients needed to calculate SEQ are read from memory. At step 208, SEQ is calculated using these coefficients, and at step 210, the calculated value of SEQ is inserted into a data stream and sent over a network. In one embodiment, the generated sequence numbers may be inserted into a packet-less data stream. Alternatively, the generated sequence numbers may be inserted into packets, which are then sent over a packet network. Example packets include, but are not limited to, Ethernet packets, Internet protocol (IP) packets, Fibre Channel (FC) packets, and asynchronous transfer mode (ATM) packets. The values of SEQ so calculated may be included anywhere in the data stream. When the data stream includes packets, the value of SEQ may be included anywhere in the packet, such as in the packet header or packet payload. Likewise, generated packets may contain one or more SEQ values, and may even contain no SEQ values, i.e., not every generated packet has to contain a SEQ value. In one embodiment, these packets are test packets that are created by a network test equipment and sent to a device under test or DUT.

Figure 1:
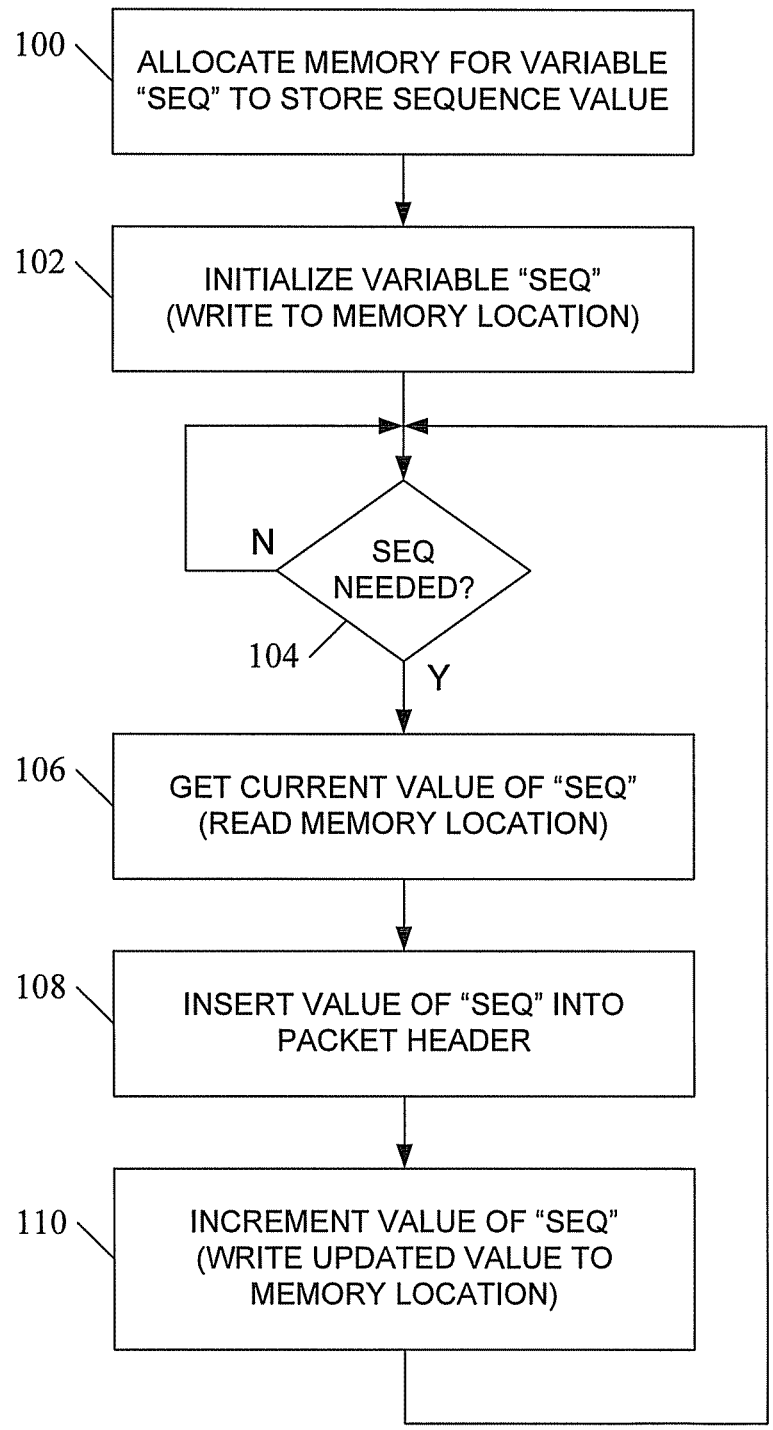
FIG. 1 is a flow chart showing a conventional method of generating sequence numbers by using variables that are stored in memory.

In the embodiment illustrated in FIG. 2, the next number in the sequence is also referred to as "SEQ", but there is a fundamental difference between the conventional method illustrated in FIG. 1 and the method illustrated in FIG. 2. In FIG. 1, the memory stores the next value of SEQ, but in FIG. 2, the memory stores coefficients that are used to calculate the next value of SEQ. Because of this difference, every time SEQ is needed, the method of FIG. 1 performs a read-modify-write operation while the method of FIG. 2 performs a read operation but does not perform a write operation.

Thus, in contrast to the conventional method illustrated in FIG. 1, in the embodiment illustrated in FIG. 2, after the initial write to a memory location that has been allocated for storing coefficients used to generate sequence numbers, the method shown in FIG. 2 reads from, but does not write to, the memory. For this reason, this method is referred to as a "low-overhead" or "no-write" implementation. By replacing the "read-modify-write" approach used in conventional systems with the "read-only" approach shown in FIG. 2, this reduces system memory bus traffic by half and thus eliminates one potential bottleneck that might otherwise reduce or limit performance of network test equipment, for example. In one embodiment, step 206 may be skipped if the needed coefficients have already been read and have been cached or are known to be reused for the next sequence, providing an additional improvement in efficiency.

An exemplary process for low-overhead sequence number generation according to an embodiment of the subject matter will now be described in more detail. In one embodiment, a low-overhead sequence number generator is used to generate a sequence for inclusion in an instrumentation header. In packet networks, the instrumentation header may be information located in a packet's payload rather than in the packet's header. The instrumentation header is not used by the device under test but is used by the test equipment to track how data and/or packets for various flows are processed, e.g., to detect dropped, duplicated, or reordered packets. In one embodiment, the instrumentation header includes a session identifier that is associated with a flow or session. In packet networks, this may be a packet group ID (PGID) that is used to identify a flow. The instrumentation header may include a timestamp and a sequence number, where each flow has its own sequence of numbers. An example instrumentation header as it might be used in a packet network is shown in FIG. 3.

Figure 3:
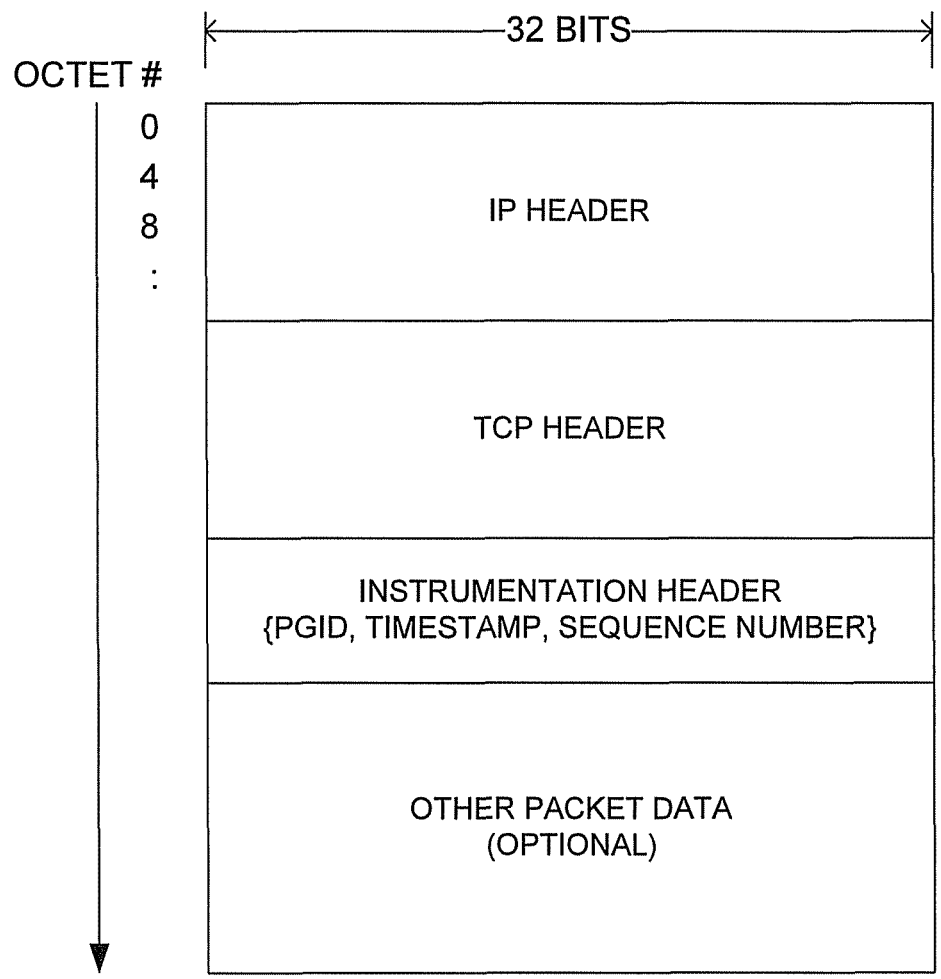
FIG. 3 illustrates an exemplary TCP packet including an instrumentation header according to an embodiment of the subject matter described herein.

FIG. 3 illustrates an example TCP packet including an instrumentation header according to an embodiment of the subject matter described herein. The instrumentation header sequence does not necessarily have a one-to-one relationship with a packet header sequence, e.g., during IP fragmentation. In one embodiment, the instrument header contains a user-defined field, or UDF. Alternatively, a sequence number may be contained within a UDF that is not part of an instrumentation header. In one embodiment, a UDF is associated with a counter that may be configured in a number of ways in order to generate data patterns within packets.

Figure 4:
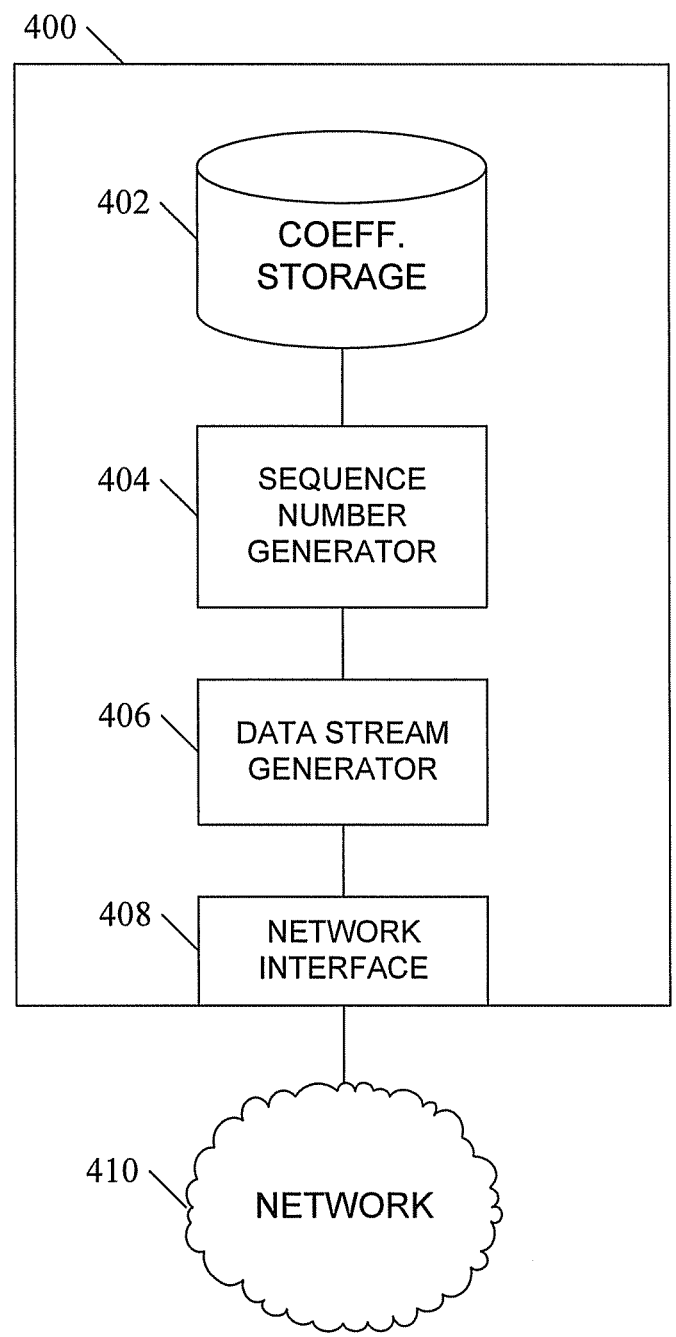
FIG. 4 is a block diagram illustrating an exemplary system for data generation with low-overhead sequence number generation according to an embodiment of the subject matter described herein.

FIG. 4 is a block diagram illustrating an exemplary system for data generation with low-overhead sequence number generation according to an embodiment of the subject matter described herein. In the embodiment illustrated in FIG. 4, system 400 includes a data storage entity 402 for storing a set of coefficients that are used to generate a sequence of numbers according to a desired pattern and a sequence number generator 404 for generating the sequence of numbers according to the desired pattern for insertion into a data stream, which may be packet data or a packet-less data stream. In one embodiment, data storage entity 402 may be computer memory or other suitable data store, including but not limited to dynamic random access memory (DRAM), static RAM, flash memory, and even read only memory (ROM) if the coefficients are well-defined and unlikely to change. Sequence number generator 404 provides the generated number sequence to a data stream generator 406, which generates a data stream that includes the sequence number or numbers and transmits the generated data stream via a network interface 408 for connecting system 400 to a network 410. In one embodiment, network interface 408 is packet network interface, such as an Ethernet network interface, and network 410 is a packet network, such as an Ethernet network or the Internet. In one embodiment, system 400 is a network test equipment that generates test data, which are sent via network 410 to a device under test, or DUT.

Figure 5:
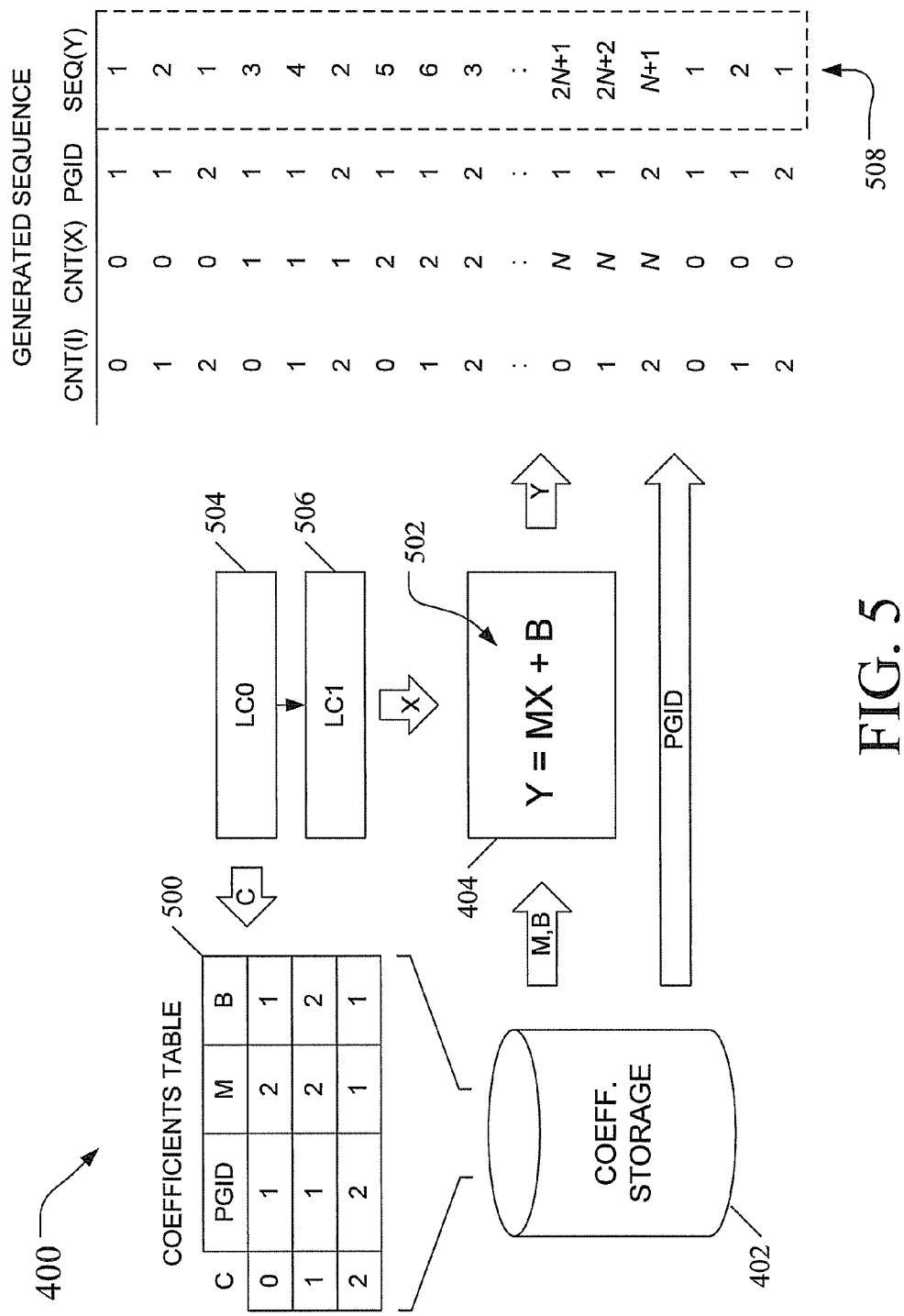
FIG. 5 is a block diagram illustrating in more detail an exemplary system for system for data generation with low-overhead sequence number generation according to an embodiment of the subject matter described herein.

FIG. 5 is a block diagram illustrating in more detail an exemplary system for system for data generation with low-overhead sequence number generation according to an embodiment of the subject matter described herein. In one embodiment, the set of coefficients may be stored within data storage entity 402 as a coefficients table 500. In the embodiment illustrated in FIG. 5, for example, system 400 generates packet data for transmission over a packet network, and so coefficients table 500 includes three rows, each row containing a packet group ID (PGID) and a set of coefficients M and B, but data storage entity 402 may contain multiple tables and coefficients table 500 can be of any size.

In the embodiment illustrated in FIG. 5, sequence number generator 404 reads from data storage entity 402 the set of coefficients and uses the set of coefficients to calculate a value for a sequence number according to an equation 502 for calculating a sequence number value. For example, in FIG. 4, equation 502 is the linear equation Y=MX+B, where Y is the value of the sequence number being output by the equation, M and B are coefficients of the equation that are provided by data storage entity 402. A first loop counter LC0 504 outputs a count value C, which is used as a row index into coefficients table 500. In the embodiment illustrated in FIG. 5, for example, LC0 504 outputs the repeating sequence {0,1,2,0, 1,2, . . . }. The independent variable X may be provided by a second loop counter LC1 506. In one embodiment, the counters may operate in a nested fashion, e.g., the overflow signal of LC0 504 may be used as the count signal into LC1 506 such that the value of X increments by one after every pass through all of the rows of coefficients table 500. In this scenario, LC0 504 provides an inner loop count and LC1 506 provides an outer loop count. Although only two counters are shown in FIG. 5, the subject matter described herein can be extended to apply to any number of counters. Likewise, counters may be chained together as described above, may operate independently of each other, or some combination.

In one embodiment, prior to operation of sequence number generator 404, a set of coefficients are written to data storage entity 402 and loop counters 504 and 506 are set to initial values. In one embodiment, maximum counter values may be defined for the counters. In the embodiment illustrated in FIG. 4, for example, a maximum value of L is defined for LC0 504 and a maximum value of N is defined for LC1 506. After this initialization process, sequence number generation can begin. In one embodiment, LC0 504 is used as a table index, to cycle through the rows of coefficients table 500, e.g., by counting from 1 to L and repeating. In the embodiment illustrated in FIG. 5, for example, L=3, the number of rows of coefficients table 500.

As each row of coefficients table 500 is read, sequence number generator 404 calculates the value of Y using the value of X provided by second counter 506 and the values of M and B provided by coefficients table 500. The value of Y so calculated becomes the sequence number SEQ, which is paired with the value of PGID also provided by each row of coefficients table 500 to produce the pair {PGID,SEQ}. FIG. 5 includes an example generated sequence that includes a column of SEQ values 508. In the embodiment illustrated in FIG. 5, the particular coefficients contained within coefficients table 500 and used in equation 502 implemented by sequence number generator 404 produces the following sequence of {PGID,SEQ} pairs, arranged graphically so that PGIDs are grouped into columns:

{1, 1}, {1, 2}, {2, 1},
{1, 3}, {1, 4}, {2, 2},
{1, 5}, {1, 6}, {2, 3},
⋮              ⋮
{1, 2$N$ + 1}, {1, 2$N$ + 2}, {2, $N$ + 1} before starting over at {1,1}, {1,2}, {2,1}, etc. It should be noted that during generation of the sequence numbers, the values of the set of coefficients that are stored in data storage entity 402 do not change. Thus, system 400 implements a sequence generation method that, except for an initialization phase in which coefficients are loaded into data storage entity 402, coefficients and PGIDs are only read from coefficients table 500 and not written to coefficients table 500.

Although the embodiment illustrated in FIG. 5 implements a relatively simple equation "Y=MX+B", other equations may be used as well. For example, in one embodiment, system 400 may include three nested loop counters LC0, LC1, and LC2, and the value of SEQ may be calculated via the following equation:

$$SEQ=LF((M_{LC1}*LC2)+B_{LC1})+LC0$$

where $M_{LC1}$ and $B_{LC1}$ represent the values of M and B, respectively, in row LC1 of coefficients table 500 and loop factor LF is a constant that comes from a UDF counter in hardware. In one embodiment, initial values, maximum values, increment values, and loop count values may be defined for each of the loop counters. Loop counters may be "count up" counters, "count down" counters, or programmable to be either.

The use of loop counters as pointers into tables of values allows for the generation of complex arbitrary, algorithmic, or random sequences in a way that uses less storage than would be required to hold the entire generated sequence, and in this manner operates as a form of data compression. Conceptually, generation of SEQ values can be thought of as a set of multiply and accumulate operations, e.g.:

$$Y=M_0X_1+B_0$$

$$X_1=M_1X_2+B_1$$

$$X_2=M_3X_3+B_3$$

. . . and so on, where the values $M_N$, $X_N$, and $B_N$ may be constant values, may be the output of counters, may be supplied by a memory location that is indexed by a counter, may be supplied by a memory location that is identified by another memory location that is indexed by a counter, etc. Thus, the equation:

$$SEQ=LF*((M_{LC1}*LC2)+B_{LC1})+LC0)$$

can be seen as a particular implementation of a generalized 2-level nested set of multiply and accumulate operations, expressed in general form as:

$$Y=M_0(M_1X_2+B_1)+B_0$$

where $M_0$ is the constant value LF, $B_0$ is the output of loop counter LC0, $M_1$ and $B_1$ are values read from a table that is indexed by loop counter LC1, and $X_2$ is the output of loop counter LC2.

By adding more counters, more complex sequences may be generated in a resource-efficient manner. For example, an additional loop counter LC3 could be used to generate sequence numbers using the following equation:

$$SEQ=((M_{LC1}*(N_{LC2}*LC3+C_{LC2})+B_{LC1})*LF+LC0$$

This principle can be extended to cover any number of counters. Moreover, elements in the equation used to generate SEQ may be constants, may be the output of loop counters or other hardware, may be provided by lookup tables, etc., in any combination.

Network testing equipment and other entities that emulate data streams or packet traffic that would be generated by multiple devices on a network may desire the capability to emulate large numbers of flows or sessions and thus may need to generate sequences for a large number of session IDs or packet group IDs. When generating packets at a high rate, for example, such equipment would get a correspondingly large benefit from the fact that system 400 does not need to perform the read-modify-write operation of conventional systems. The subject matter described herein is not limited to test equipment but may be used by any device that implements a protocol that includes sequence numbers, and even by any device that generates sequence numbers for purposes other than implementing a network communications protocol.

The linear coefficients sequence number generation method described above has the advantage that it does not require the read-modify-write operation of conventional sequence number generation methods, but it also has the disadvantage that the session or packet group IDs generated follow a specific order as defined by coefficients table 500. For example, system 400 will always produce sequence 508, while the conventional method illustrated in FIG. 1 can generate irregular or even random patterns of PGID and SEQ number, albeit at a higher resource cost and/or lower capability in terms of number of packets generated per second or number of PGIDs supported, etc. There may be times when the flexibility of the conventional method is preferable to the linear coefficients sequence number generation method, in which case it is desirable to have the ability to choose one method over the other based on current conditions. Thus, in one embodiment, the low-overhead methods and systems described above may be used in combination with other sequence number generation methods or algorithms.

Figure 6:
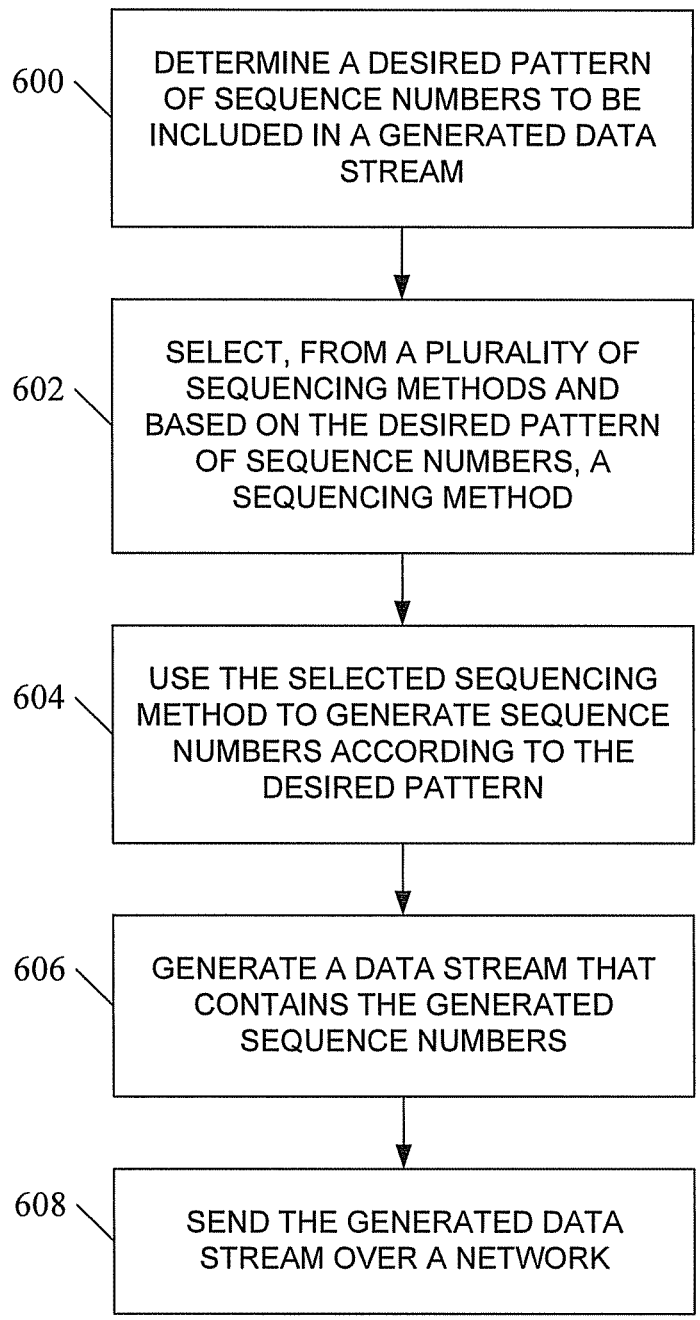
FIG. 6 is a flow chart illustrating an exemplary process for data generation with selectable sequence number generation method according to an embodiment of the subject matter described herein.

FIG. 6 is a flow chart illustrating an exemplary process for data generation with selectable sequence number generation method according to an embodiment of the subject matter described herein. In one embodiment, this method may be performed at an entity for generating a data stream. As above, the data stream may include packets or packet-less data. The method includes, at step 600, determining a desired pattern of sequence numbers to be included in the generated data stream. At step 602, a sequencing method for generating sequence numbers is selected from among multiple sequencing methods based on the desired pattern of sequence numbers. At step 604, the selected sequencing method is used to generate sequence numbers in the desired pattern. Step 606 includes generating a data stream that contains the generated sequence numbers, and in step 608, the generated data stream is sent over a network. In embodiments where the data stream includes packets, sequence numbers may be generated one at a time before each packet is sent over a packet network.

TABLE 1

Methods for generating sequence numbers

| Method | Description | Characteristic |
|---|---|---|
| 1 | Simple sequence | No read, no write |
| 2 | 2-level nested sequence | No read, no write |
| 3 | 3-level nested sequence | No read, no write |
| 4 | Linear coefficients sequence generation | Read but no write |
| 5 | Per-flow UDF | Read and write |

Table 1, above, lists five different methods for generating sequence numbers. FIGS. 7A through 7E show examples of packet group ID sequence number pairs {PGID,SEQ} that may be output by each of these methods, but the same principle may be applied for generating session IDs for packet-less data streams, for example.

FIG. 7A shows an example of a simple sequence according to an embodiment of the subject matter described herein. In the simple sequence illustrated in FIG. 7A, for example, sequence numbers are needed for just one PGID and the sequence number increments from 1 to value N and starts at 1 again. Thus, the simple sequence illustrated in FIG. 7A produces {PGID,SEQ} values of {1,1}, {1,2}, {1,3}, . . . {1,N−1}, and {1,N} before restarting at {1,1} again.

FIG. 7B shows an example of a 2-level nested sequence according to an embodiment of the subject matter described herein. In the embodiment illustrated in FIG. 7B, packets are produced for three different PGIDs having values of 1, 2, and 3, respectively, but 3 other unique values could be used instead. The {PGID,SEQ} pairs are produced in the following order, arranged graphically so that PGIDs are grouped into columns:

{1, 1},      {2, 1},      {3, 1},
{1, 2},      {2, 2},      {3, 2},
{1, 3},      {2, 3},      {3, 3},
  ⋮            ⋮            ⋮
{1, N − 1},  {2, N − 1},  {3, N − 1},
{1, N},      {2, N},      {3, N},
{1, 1},      {2, 1},      {3, 1},
  ⋮            ⋮            ⋮

FIG. 7C shows an example of a 3-level nested sequence according to an embodiment of the subject matter described herein. In the embodiment illustrated in FIG. 7C, packets are produced for three PGIDs (again having values of 1, 2, and 3, respectively) but the {PGID,SEQ} pairs are produced in the following order, arranged graphically so that PGIDs are grouped into columns:

{1, 1}, {1, 2},        {2, 1}, {2, 2},        {3, 1}, {3, 2},
{1, 3}, {1, 4},        {2, 3}, {2, 4},        {3, 3}, {3, 4},
  ⋮                      ⋮                      ⋮
{1, N − 1}, {1, N},    {2, N − 1}, {2, N},    {3, N − 1}, {3, N},
{1, 1}, {1, 2},        {2, 1}, {2, 2},        {3, 1}, {3, 2},
  ⋮                      ⋮                      ⋮

FIG. 7D shows an example of generating sequence numbers using linear coefficients according to an embodiment of the subject matter described herein. In the embodiment illustrated in FIG. 7D, packets are produced for two PGIDs (having values of 1 and 2, respectively) having the following sequence of {PGID,SEQ} pairs, arranged graphically so that PGIDs are grouped into columns:

{1, 1}, {1, 2},              {2, 1},
{1, 3}, {1, 4},              {2, 2},
{1, 5}, {1, 6},              {2, 3},
  ⋮                            ⋮
{1, 2N + 1}, {1, 2N + 2},    {2, N + 1}
{1, 1}, {1, 2},              {2, 1},
  ⋮                            ⋮

This is the same sequence that was produced by embodiment of the system illustrated in FIG. 4.

FIG. 7E shows an example of generating sequence numbers using a system that stores the next SEQ value for each PGID in memory and that reads the memory to retrieve the SEQ value, inserts the value into a generated packet, increments the value of SEQ, and stores the incremented value back to memory. This read-modify-write approach allows a system to generate PGIDs in any order, including in random order or in response to some external event such as receipt of a packet from another node. In the embodiment illustrated in FIG. 7E, packets are produced for four PGIDs having values 1 through 4, respectively, having the following sequence of {PGID,SEQ} pairs, arranged graphically so that PGIDs are grouped into columns:

| | | | |
|---|---|---|---|
| {1, 1}, | {2, 1}, | | {4, 1} |
| {1, 2}, | | {3, 1}, | |
| | | {3, 2}, | |
| {1, 3}, | {2, 2}, | | {4, 2}, |
| | | {3, 3}, | |
| | {2, 3}, | | |
| {1, 4}, | | {3, 4}, | {4, 3}, |
| | | {3, 5}, | |
| | {2, 4} | | |

. . . and so on. It can be seen that this approach allows greater flexibility and variation of the sequence of {PGID,SEQ} pairs being generated. A system that can select between these different sequence generation methods is shown in FIG. 8.

Figure 8:
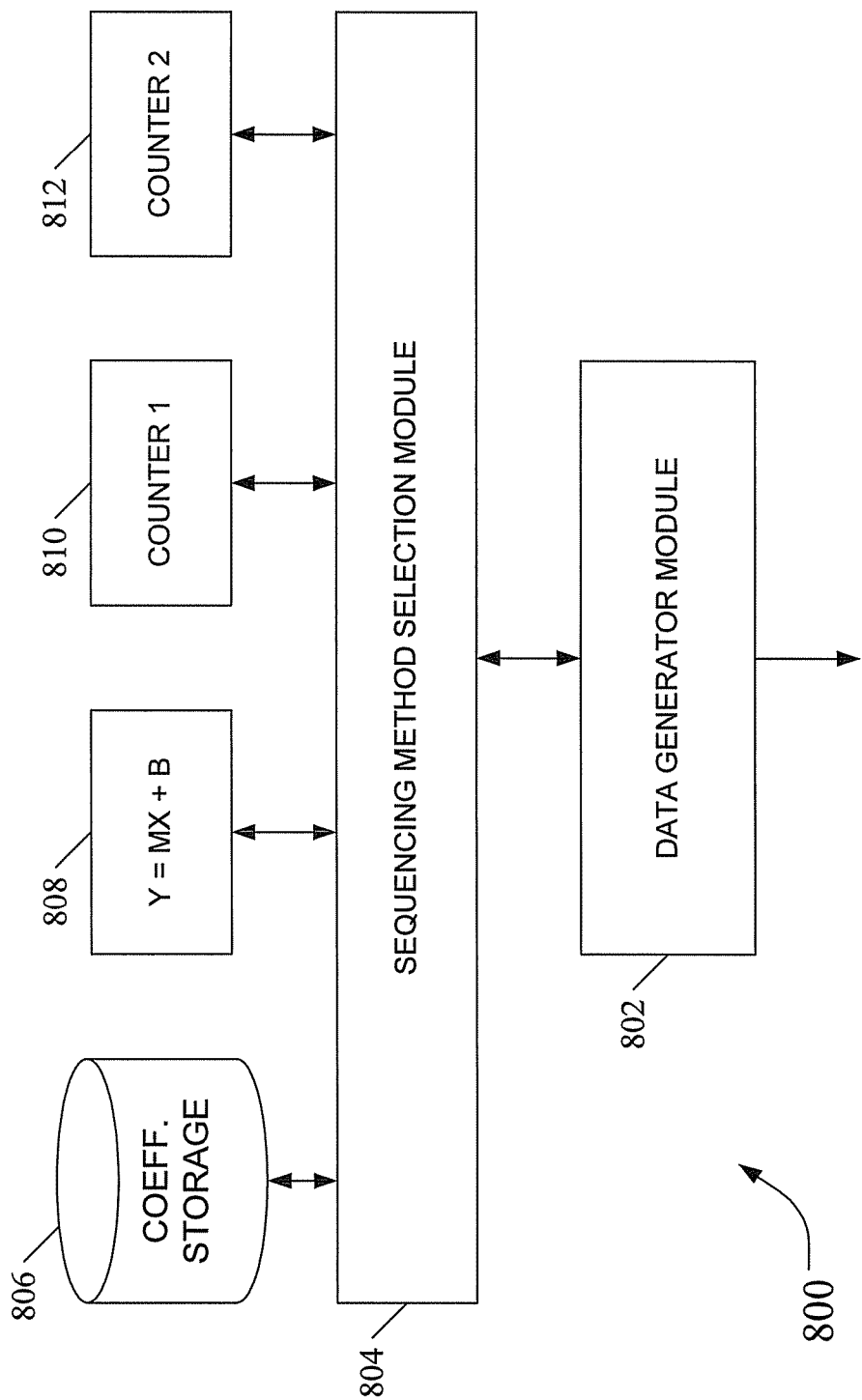
FIG. 8 is a block diagram illustrating an exemplary system for data generation with selectable sequence number generation method according to an embodiment of the subject matter described herein.

FIG. 8 is a block diagram illustrating an exemplary system for data generation with selectable sequence number generation method according to an embodiment of the subject matter described herein. In the embodiment illustrated in FIG. 8, system 800 includes a data generator module 802 for generating a data stream containing sequence numbers and a sequencing method selection module 804 that selects, from multiple sequencing methods, a sequencing method for generating a desired pattern of sequence numbers to be included in the generated data stream, uses the selected sequencing method to generate the desired pattern of sequence numbers, and provides the generated sequence numbers to data generator module 802 for inclusion in the generated data stream.

In the embodiment illustrated in FIG. 8, system 800 includes a data storage unit 806 for storing coefficients for use with a linear coefficient sequence number generator 808 to generate sequence numbers according to the method described in FIG. 2. System 800 also includes counters 810 and 812, which may be used for inner and outer loop counters, for example. In one embodiment, sequencing method selection module 804 is provided with or determines the desired pattern of sequence numbers and selects a sequencing method accordingly.

For example, where greatest flexibility is desired even at the expense of additional resource demands, sequencing method selection module 804 may choose to implement a conventional read-modify-write method such as is described in FIG. 1, using data storage unit 806 as local memory for storing the current SEQ value for each packet or session ID. In this scenario, sequence method selection module 804 may perform the read-modify-write operation itself, or it may direct another module to perform that function.

Alternatively, if the desired sequence is a simple sequence, sequencing method selection module 804 may enlist one or both of the counters 810 and 812 to generate the sequence numbers, in which case it is not necessary to read or write data within data storage unit 806 at all.

If sequencing method selection module 804 determines that the linear coefficients sequencing method is appropriate, sequencing method selection module 804 may implement the linear coefficients sequencing method, e.g., by performing the steps illustrated in FIG. 2. In this scenario, sequencing method selection module 804 may enlist data storage unit 806 to store a coefficients and enlist linear coefficient sequence number generator 808 to generate the sequence numbers. In one embodiment, sequencing method selection module 804 may retrieve the coefficients from data storage unit 806 and counter values from counter 1 810 and pass them to linear coefficient sequence number generator 808. Linear coefficient sequence number generator 808 receives those values and uses them to generate a SEQ value according to a linear coefficients equation, and passes that generated value back to sequencing method selection module 804. Where system 800 is being used to generate packets, for example, sequencing method selection module 804 provides a {PGID,SEQ} pair to data generator module 802 for inclusion in the next generated packet. Thus, in one embodiment, sequencing method selection module 804 selects a sequencing method from a number of sequencing methods and uses the selected method to generate sequence numbers for inclusion in packets that are generated by data generator module 802.

The system illustrated in FIG. 8 is illustrative and not intended to be limiting. For example, in alternative embodiments, the functions of determining and selecting the appropriate sequencing method, implementing the selected sequencing method, and generating data or packets that include numbers generated by the selected sequencing method may be performed by other modules, by a single module, or using a different division of labor between modules than is illustrated in FIG. 8.

In one embodiment, the method to generate sequence numbers for inclusion may be selected based on the session or packet group ID values that will be generated. An example of this selection process is shown in FIG. 9 and will now be described with reference to the system illustrated in FIG. 8.

Figure 9:
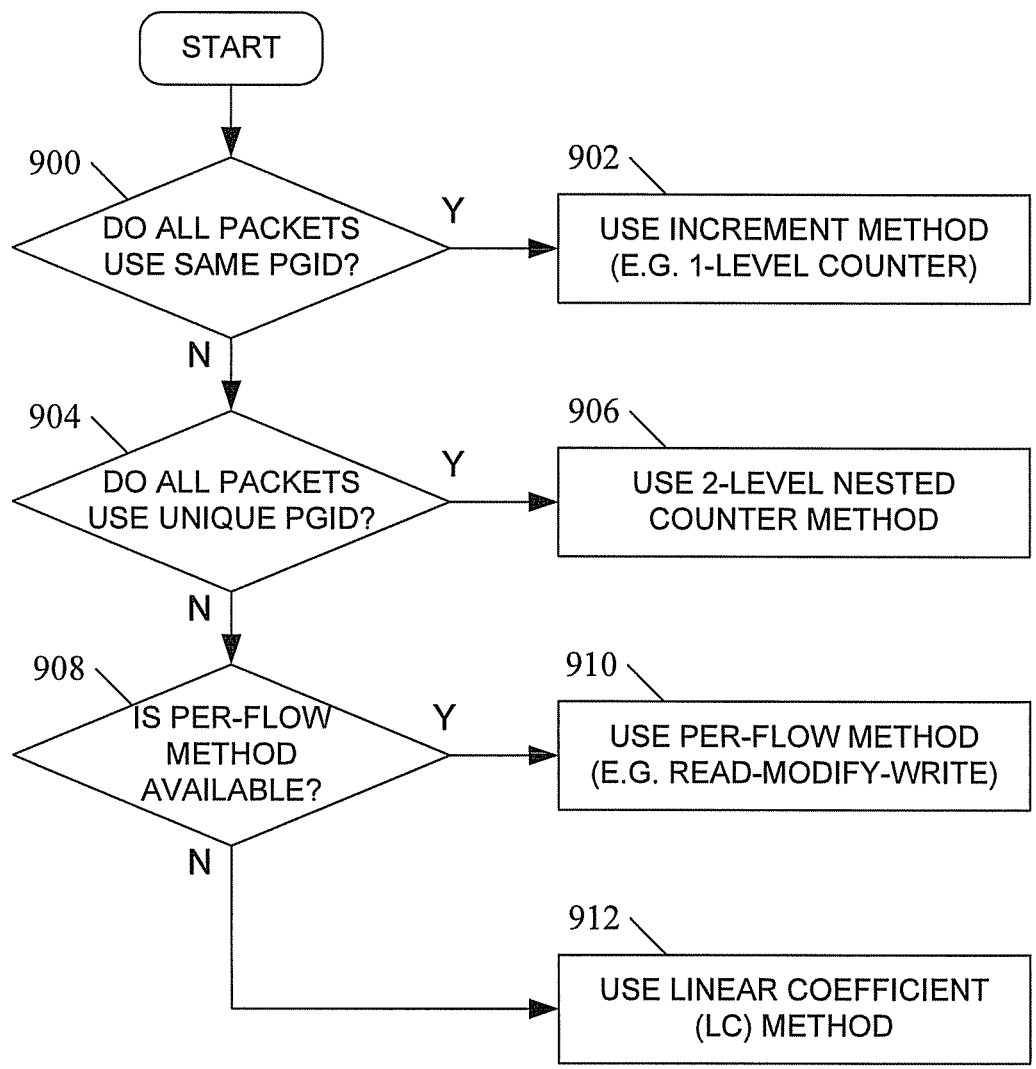
FIG. 9 is a flow chart illustrating an exemplary process for selecting a method for generating sequence numbers from a plurality of methods for generating sequence numbers according to an embodiment of the subject matter described herein.

FIG. 9 is a flow chart illustrating an exemplary process for selecting a method for generating sequence numbers from a plurality of methods for generating sequence numbers according to an embodiment of the subject matter described herein. In the embodiment illustrated in FIG. 9, the generated sequence numbers are inserted into packets, but the same principles may be applied to generate sequence numbers that will be inserted into a packet-less data stream.

In one embodiment, this process may be performed by sequencing method selection module 804. At step 900, the process determines if all packets to be generated will have the same PGID value. If so, the simple increment method is selected (step 902.) For example, a counter, such as counter 1 810, may be enlisted to generate incrementing values for SEQ in the {PGID,SEQ} pair.

If, at step 900, the PGID values are not the same, at step 904, the process determines whether all packets use unique PGIDs such that one counter can be used to generate the PGIDs and another counter can be used to generate the SEQ values for the {PGID,SEQ} pairs. If so, a 2-level nested method is selected (step 906.) In one embodiment, a pair of counters, such as counter 1 810 and counter 2 812, may be used to generate PGID and SEQ values, respectively, of the {PGID,SEQ} pair. In one embodiment, the counters may be daisy-chained, for example, so that an overflow of the SEQ counter causes an increment of the PGID counter, or so that an overflow of the PGID counter causes an increment of the SEQ counter, etc.

If, at step 904, all of the packets PGIDs are not unique, such as when the PGIDs are to be generated in a complex sequence or when the ratio of the number of packets to be generated for one PGID versus the number of packets to be generated for another PGID is not a 1:1 ratio, at step 908 the process determines whether the "per-flow" (read-modify-write) method is available. If so, the per-flow method is used (step 910.) For example, packet generate module 802 may use memory (not shown) such as RAM to store PGIDs used and to store the next SEQ number for each respective PGID. In one embodiment, a per-flow method may be deemed available if the system hardware supports this method. A per-flow method may be deemed unavailable if the system hardware does not support this method or if the system hardware does support this method but the desired rate of traffic to be generated is higher than the system can provide using this method.

If, at step 908, the per-flow method is deemed to be unavailable, the process goes to step 912, in which the linear coefficient method is selected. For example, sequencing method selection module may enlist linear coefficient sequence number generator 808, one or both of counter 1 810 and counter 2 812, and data storage unit 806 to generate sequence numbers according to the linear coefficient methods described above.

In this manner, a sequence generation method may be selected based on the desired sequence of PGIDs, the capability of the system, and/or other factors.

Figure 10:
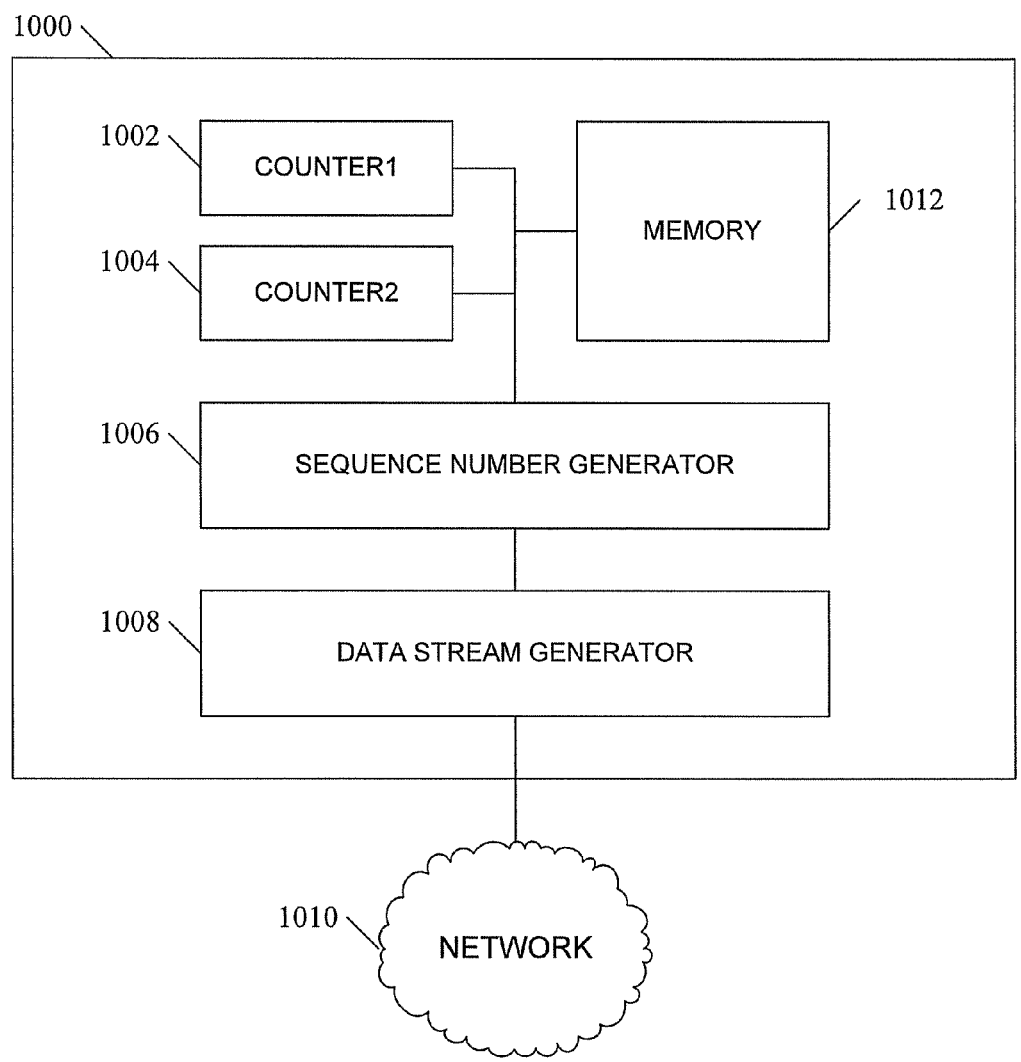
FIG. 10 is a block diagram illustrating an exemplary system for sequence number generation for insertion into a data stream according to an embodiment of the subject matter described herein.

FIG. 10 is a block diagram illustrating an exemplary system for sequence number generation for insertion into a data stream according to an embodiment of the subject matter described herein. In the embodiment illustrated in FIG. 10, system 1000 includes multiple counters 1002 and 1004, a sequence number generator 1006 for generating a sequence of numbers according to a desired pattern, and a data generator 1008, which generates a data stream that includes the generated sequence of numbers and sends the generated data stream over a network 1010. Sequence number generator 1006 receives multiple input values, at least two of which are either the output of a counter or a value referenced by the output of a counter, and uses the received input values to calculate a number in the sequence. In one embodiment, system 1000 may include a computer memory 1012 for storing data, such as variables, constants, coefficients, etc.

Examples of counter outputs include, but are not limited to: the current count value of the counter; an overflow or underflow signal produced when a counter reaches its maximum or minimum value and rolls over; a reload signal produced when a counter has counted a specified number of times; and a reset signal produced when a count-up counter is reset to zero or when a count-down counter is reset to an initial value.

Examples of values referenced by the output of a counter include, but are not limited to: values produced when the output of a counter is used as an index or pointer into a location within computer memory 1012, and data stored at that location is provided as an input into sequence number generator 1006; values selected by a counter output value or signal and input into sequence number generator 1006; and values or selected by a combination of counter outputs and/or signals, etc., and input into sequence number generator 1006. In one embodiment, the overflow signals for multiple counters may be used to select a value to be added to the current SEQ to generate the next value of SEQ. For example, when an inner loop counter rolls over or reaches a count value or counter threshold, the current value of SEQ could be incremented by a first increment value, but when an outer loop counter rolls over or reaches a count value or counter threshold, the current value of SEQ could be incremented by a second increment value different from the first increment value.

In one embodiment, sequence number generator 1006 calculates a sequence number according to an equation for generating a sequence of numbers in a desired pattern. Example equations include the linear coefficients equations shown above. In one embodiment, calculating a number may involve a variety of operations, such as addition, subtraction, multiplication, and division, as well as bitwise or logical operations and any other mathematical functions, such as multiply and accumulate operations. For example, a new value of SEQ may be calculated by adding the value of one counter to the value of another, by multiplying the value of one counter by the value of another counter, or performing other operations using the values of the two counters 1002 and 1004. These operations can be performed using the output of a counter and a constant value provided as input to sequence number generator 1006. In addition to the multiple inputs consisting of either a counter output or a value referenced by a counter output, additional inputs may include outputs or values referenced by outputs of additional counters, constant values, and other inputs.

In one embodiment, sequence number generator 1006 includes a central processing unit (CPU), digital signal processor (DSP), or other hardware, software, or firmware for evaluating the equation using the inputs to sequence number generator 1006 as inputs into the equation.

Figure 11:
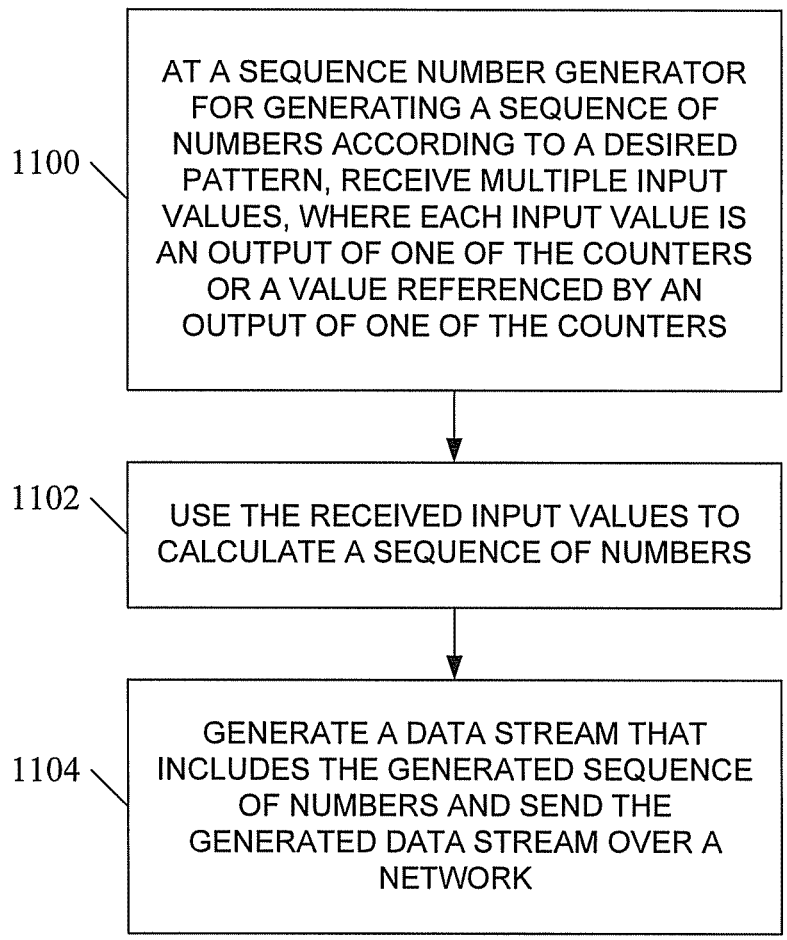
FIG. 11 is a flow chart illustrating an exemplary process for generating a sequence of numbers for insertion into a data stream according to an embodiment of the subject matter described herein.

FIG. 11 is a flow chart illustrating an exemplary process for generating a sequence of numbers for insertion into a data stream according to an embodiment of the subject matter described herein. At step 1100, a sequence number generator for generating a sequence of numbers according to a desired pattern receives a plurality of input values, where each input value is an output of one of the plurality of counters or a value referenced by an output of one of the plurality of counters. At step 1102, the received input values are used to calculate the sequence of numbers. At step 1104, a data stream that includes the generated sequence of numbers is generated and sent over a network. In one embodiment, additional input values may also be used to calculate the sequence of numbers.

It will be understood that various details of the subject matter described herein may be changed without departing from the scope of the subject matter described herein. Furthermore, the foregoing description is for the purpose of illustration only, and not for the purpose of limitation.

What is claimed is:

1. A system for data generation with low-overhead sequence number generation, the system comprising:
   a data storage entity for storing a set of coefficients for generating a sequence of numbers according to a desired pattern;
   a sequence number generator for generating the sequence of numbers according to the desired pattern for insertion into a data stream, wherein the sequence number generator reads from the data storage entity the set of coefficients and uses the set of coefficients to calculate a value for a sequence number according to an equation for calculating a sequence number value and wherein, during generation of the sequence numbers, the values of the set of coefficients that are stored in the data storage entity do not change, wherein the sequence number generator calculates the value for the sequence number according to the equation, which uses the values for the set of coefficients and a dependent variable and wherein the dependent variable is provided by a counter comprising at least one of a loop counter, a count-up counter, and a count-down counter; and
   a data generator for generating and sending a data stream that includes the generated sequence numbers over a network.

2. The system of claim 1 wherein the data stream generated by the data generator comprises packets that include the generated sequence numbers and that are sent over a packet network.

3. The system of claim 2 wherein the packet generator generates at least one of: Internet protocol packets, Ethernet packets, Fibre Channel packets, and asynchronous transfer mode packets.

4. The system of claim 2 wherein the generated sequence numbers are included within a user defined field (UDF) of the generated packet.

5. The system of claim 1 wherein the generated sequence numbers are part of an instrumentation header that is included within the generated data stream.

6. The system of claim 1 wherein the set of coefficients includes an identifier that is associated with a flow or session.

7. The system of claim 1 wherein the data storage entity comprises at least one of a dynamic random access memory, a static random access memory, a flash memory, a read-only memory, and logic for storing data.

8. The system of claim 1 wherein the data generator generates test data and sends it to a device under test.

9. The system of claim 1 wherein the sequence number generator is a component of network test equipment.

10. A method for data generation with low overhead sequence number generation, the method comprising:

storing, in a data storage entity, a set of coefficients for generating a sequence of numbers according to a desired pattern;

generating the sequence of numbers according to the desired pattern for insertion into a data stream, wherein generating the sequence numbers includes reading from the data storage entity the set of coefficients and using the set of coefficients to calculate a value for a sequence number according to an equation for calculating a sequence number value and wherein, during generation of the sequence numbers, the values of the set of coefficients that are stored in the data storage entity do not change, wherein using the set of coefficients to calculate a value for a sequence number according to an equation for calculating a sequence number value includes using a dependent variable, and wherein the dependent variable is provided by a counter comprising at least one of a loop counter, a count-up counter, and a count-down counter;

generating a data stream that includes the generated sequence of numbers; and sending the generated data stream over a network.

11. The method of claim 10 wherein generating a data stream comprises generating packets and wherein sending the generated data stream over a network comprises sending the generated packets over a packet network.

12. The method of claim 11 wherein generating packets comprises generating at least one of: Internet protocol packets, Ethernet packets, Fibre Channel packets, and asynchronous transfer mode packets.

13. The method of claim 10 wherein the generated sequence of numbers are included within a user defined field (UDF) of the generated packets.

14. The method of claim 10 wherein the generated sequence of numbers are part of an instrumentation header that is included within the generated data stream.

15. The method of claim 10 wherein the set of coefficients includes an identifier that is associated with a flow or session.

16. The method of claim 10 wherein the data storage entity comprises at least one of a dynamic random access memory, a static random access memory, a flash memory, a read-only memory, and logic for storing data.

17. The method of claim 10 wherein generating data comprises generating test data and wherein sending data comprises sending the generated test data to a device under test.

18. The method of claim 10 wherein the storing and generating steps are performed at network test equipment.

19. A non-transitory computer readable medium having stored thereon executable instructions that when executed by the processor of a computer control the computer to perform steps comprising:

storing, in a data storage entity, a set of coefficients for generating a sequence of numbers according to a desired pattern;

generating the sequence of numbers according to the desired pattern for insertion into a data stream, wherein generating the sequence numbers includes reading from the data storage entity the set of coefficients and using the set of coefficients to calculate a value for a sequence number according to an equation for calculating a sequence number value and wherein, during generation of the sequence numbers, the values of the set of coefficients that are stored in the data storage entity do not change, wherein using the set of coefficients to calculate a value for a sequence number according to an equation for calculating a sequence number value includes using a dependent variable, and wherein the dependent variable is provided by a counter comprising at least one of a loop counter, a count-up counter, and a count-down counter;

generating a data stream that includes the generated sequence of numbers; and sending the generated data stream over a network.

* * * * *